United States Patent
Komar et al.

(10) Patent No.: US 9,669,838 B2
(45) Date of Patent: Jun. 6, 2017

(54) METHOD AND SYSTEM FOR INFORMATION USE

(71) Applicant: Continental Teves AG & Co. oHG, Frankfurt (DE)

(72) Inventors: Matthias Komar, Frankfurt am Main (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 114 days.

(21) Appl. No.: 14/411,960

(22) PCT Filed: Jul. 2, 2013

(86) PCT No.: PCT/EP2013/063917
§ 371 (c)(1),
(2) Date: Dec. 30, 2014

(87) PCT Pub. No.: WO2014/006034
PCT Pub. Date: Jan. 9, 2014

(65) Prior Publication Data
US 2015/0166071 A1    Jun. 18, 2015

(30) Foreign Application Priority Data
Jul. 2, 2012    (DE) .................. 10 2012 211 391

(51) Int. Cl.
*B60W 40/04*    (2006.01)

(52) U.S. Cl.
CPC ......... *B60W 40/04* (2013.01); *B60W 2420/42* (2013.01); *B60W 2420/52* (2013.01);
(Continued)

(58) Field of Classification Search
None
See application file for complete search history.

(56) References Cited

U.S. PATENT DOCUMENTS 6,397,149 B1 * 5/2002 Hashimoto .......... G05D 1/0297
  701/300
7,825,849 B2 * 11/2010 Tsuchida ............... G01S 13/931
  342/52

(Continued)

FOREIGN PATENT DOCUMENTS

DE    102005002504    7/2006
DE    102006047131    4/2008
(Continued)

OTHER PUBLICATIONS

Machine Translation of DE 102008061301; Jun. 2009; espacenet.com.*

(Continued)

*Primary Examiner* — John R Olszewski
*Assistant Examiner* — David Merlino
(74) *Attorney, Agent, or Firm* — RatnerPrestia

(57) ABSTRACT

Using sensors of a first and second sensor type first and second sensor data are detected and items of information describing identical objects and/or object attributes are allocated to one another in the first and second sensor data. The first and second sensor data are encumbered by first and second ambiguities. Values of the second encumbering ambiguities are at least as great as values of the first encumbering ambiguities. A comparison of the first and second encumbering ambiguities of items of information describing identical objects and/or object attributes takes place. In the case of values of substantially the same size, the items of information describing identical objects and/or object attributes are allocated to one another in the first and second sensor data. In the case of values which are not of substantially the same size the items of information describing identical objects and/or object attributes are confirmed or discarded.

12 Claims, 2 Drawing Sheets

(52) U.S. Cl.
CPC ..... *B60W 2420/54* (2013.01); *B60W 2420/62* (2013.01); *B60W 2550/408* (2013.01)

(56) References Cited

U.S. PATENT DOCUMENTS

| | | | |
|---|---|---|---|
| 8,589,060 | B2 | 11/2013 | Becker |
| 8,781,733 | B2 | 7/2014 | Staehlin |
| 8,862,384 | B2 | 10/2014 | Stahlin |
| 9,224,053 | B1* | 12/2015 | Ferguson ........... G06K 9/00798 |
| 2005/0021201 | A1* | 1/2005 | Klotz .................... B60W 30/16 |
| | | | 702/189 |
| 2007/0164896 | A1* | 7/2007 | Suzuki .................. G08G 1/161 |
| | | | 342/70 |
| 2008/0162010 | A1 | 7/2008 | Klotz |
| 2009/0016245 | A1* | 1/2009 | Karls .................... H04W 88/06 |
| | | | 370/310 |
| 2010/0052944 | A1* | 3/2010 | Luke .................... B60W 40/04 |
| | | | 340/903 |
| 2010/0114490 | A1* | 5/2010 | Becker ................. B60W 40/04 |
| | | | 701/301 |
| 2012/0010762 | A1 | 1/2012 | Asano |
| 2012/0136549 | A1* | 5/2012 | Bradai ............... B60W 40/072 |
| | | | 701/93 |
| 2012/0314070 | A1* | 12/2012 | Zhang .................. B60W 40/00 |
| | | | 348/148 |
| 2013/0158852 | A1* | 6/2013 | Stahlin .................. B60W 30/09 |
| | | | 701/301 |
| 2013/0293217 | A1* | 11/2013 | Moiseev .................. G05B 9/03 |
| | | | 324/76.77 |

FOREIGN PATENT DOCUMENTS

| | | | |
|---|---|---|---|
| DE | 102007058192 | 6/2009 | |
| DE | 102008061301 | 6/2009 | |
| DE | 102008061301 A1 * | 6/2009 | ............ B60W 30/16 |
| DE | 102009008959 | 9/2009 | |
| DE | 102009017731 | 11/2009 | |
| DE | 102010029465 | 12/2011 | |
| DE | 102011113316 | 3/2012 | |
| EP | 1882620 | 1/2008 | |

OTHER PUBLICATIONS

Cremer, F.; A comparison of decision-level sensor-fusion methods for anti-personnel landmine detection; Sep. 2001; Information Fusion; vol. 2, issue 3, p. 187-208; http://www.sciencedirect.com/science/article/pii/S1566253501000343.*

German Search Report mailed in German Application No. 10 2012 211 391.6 mailed Apr. 18, 2013.

International Search Report for International Application No. PCT/EP2013/063917 mailed Nov. 12, 2013.

* cited by examiner

METHOD AND SYSTEM FOR INFORMATION USE

CROSS REFERENCE TO RELATED APPLICATIONS

This application is the U.S. National Phase Application of PCT International Application No. PCT/EP2013/063917, filed Jul. 2, 2013, which claims priority to German Patent Application No. 10 2012 211 391.6, filed Jul. 2, 2012, the contents of such applications being incorporated by reference herein.

FIELD OF THE INVENTION

The invention relates to a method for information use and to a system for information use and to the use thereof.

BACKGROUND OF THE INVENTION

While vehicle-to-X communication is currently still state of the art, ambient sensors and driver assistance systems based thereon are already known in the prior art and are becoming increasingly widespread. In the course of continuous improvement in information capture, information processing and hence also the reliability of such driver assistance systems, increasing sensor merging is also taking place. By way of example, it is thus first of all possible to use a radar sensor to determine a distance from a vehicle traveling ahead. A stereo camera that is likewise in place can then be used to perform additional distance measurement, for example, that confirms or rejects the distance information ascertained by the radar sensor.

Similar validation of information captured by means of ambient sensors by other ambient sensor information is used for what is known as "target validated braking", for example, and is known from DE 10 2008 061 301 A1, which is incorporated by reference. In this case, a radar signal is validated by means of a camera signal by virtue of the camera signal confirming that the radar signal is reflected by a vehicle. There is no provision for additional distance measurement by means of a stereo camera. On the basis of this validation by a second sensor, the reliability of the information is comparatively high.

Further merging of different ambient sensors, such as radar sensors, camera sensors, lidar sensors and also a telematic system, which in this case is likewise understood to be an ambient sensor, is described in DE 10 2007 058 192 A1, which is incorporated by reference. A central controller is used to check the respectively nonredundantly captured information from a single sensor by analytically comparing said information with information from another sensor. In this way, it is possible, if need be, to set up information redundancy that forms the basis for safety-relevant action taken in the vehicle control.

Information association of information captured by means of ambient sensors with information captured by means of vehicle-to-X communication is often possible only with difficulty or not at all, however, since these two types of information are usually afflicted with widely different measurement inaccuracies, the vehicle-to-X information usually having the greater measurement inaccuracies. This is caused by the "position", "speed" and "acceleration" details that the vehicle-to-X information usually comprises being based at least in part on GNSS information, which is naturally comparatively inaccurate. Further problems arising therefrom are the more difficult or impossible association of the currently merged information with the information already merged in a previous cycle, for example in order to ensure object tracking, and the usually different lengths of time of the capture cycles of ambient sensors and vehicle-to-X communication devices.

SUMMARY OF THE INVENTION

An aspect of the invention therefore is a method that allows the most efficient possible information use of sensor information from different sensor types and of information received by means of vehicle-to-X communication in all situations.

On the basis of the inventive method for information use, sensors of a first sensor type are used to capture first sensor data and sensors of a second sensor type are used to capture second sensor data. Information items describing identical objects and/or object attributes in the first sensor data are associated with one another, and information items describing identical objects and/or object attributes in the second sensor data are likewise associated with one another. The first sensor data have first fuzziness afflictions and the second sensor data have second fuzziness afflictions, wherein values of the second fuzziness afflictions are at least of the same magnitude as values of the first fuzziness afflictions. The method is distinguished in that the values of the first and second fuzziness afflictions of the information items describing identical objects and/or object attributes in the first and second sensor data are compared, wherein if the values are of essentially the same magnitude then the information items describing identical objects and/or object attributes in the first and second sensor data are associated with one another, and wherein if the values are of essentially not the same magnitude then the information items describing identical objects and/or object attributes in the first sensor data are confirmed or rejected by the second sensor data. This results in the advantage that extremely largely optimum information use takes place in all cases on a basis of the respective fuzziness afflictions. Provided that the values of the fuzziness afflictions are thus of essentially the same magnitude, the information items captured by means of the different sensor types are associated with one another, i.e. inherent merging of said information items from different sensor types takes place. The information items merged in this manner are deemed particularly reliable and are usually suitable as a basis for autonomous control action taken in the vehicle control. If the values of the fuzziness afflictions are essentially not of the same magnitude, however, then the second sensor data are used at least in order to confirm or reject information items in the first sensor data in principle. Hence, the first sensor data are thus validated by the second sensor data in this case, which means that they are also accredited with greater reliability and they too can be used for further actions, such as the output of a warning, if need be. Since exclusively those information items for which the values of the fuzziness afflictions are of essentially the same magnitude are associated with one another, the further advantage is obtained that the usually comparatively high level of electronic computation involvement for the association can be reduced. Nevertheless, all captured information is used in optimum fashion to an extremely large extent.

Within the context of the invention, the values of the fuzziness afflictions are regarded as being of essentially the same magnitude if they differ from one another by no more than 50%, particularly by no more than 25%. As a variable for the fuzziness afflictions, it is possible to use what is known as the standard deviation known from statistics, for example. Similarly, it is alternatively possible to use other known variables that indicate a measure of the scatter of values around a reference value. According to the invention, a suitable reference value is a mean value, a maximum value or else a median, for example.

Preferably, the sensors of the first sensor type are ambient sensors and the sensors of the second sensor type are vehicle-to-X communication means. This results in the advantage that information items from these two sensor types, which operate according to very different principles, can easily be associated with one another or the vehicle-to-X information items can easily confirm or reject the ambient sensor information items. This additionally helps to reduce the electronic computation involvement, which is very high in this specific case, that usually arises for the association of vehicle-to-X information items with ambient sensor information items. Hence, corresponding computation units can be of smaller and less expensive design.

An aspect of the invention also gives preference to further division of the ambient sensors into different classes of ambient sensors. Thus, when carrying out the inventive method, it may make sense for sensor data from a camera sensor to be distinguished from sensor data from a radar sensor, for example if they have widely different capture cycle durations or have widely different fuzziness afflictions.

In a further preferred embodiment, the first and second sensor data respectively comprise at least one position information item, and the values of the fuzziness afflictions of the position information items are used for the comparison first of all. The position information items usually provide a good reference point for taking as a basis for assessing the values of the fuzziness afflictions of the further sensor information items from the respective sensor type, since the position information items feature in a large number of further information items, such as speed or acceleration information items. Hence, the possibly unnecessary comparison of the values of the fuzziness afflictions further information items can be avoided. Instead, the second sensor information items can immediately be used to confirm or reject the first sensor information items.

In a particularly preferred embodiment, at least the position information item in the second sensor data has been produced using data from a global navigation satellite system prior to being sent via the vehicle-to-X communication means.

On the basis of current standardization efforts, vehicle-to-X communication means used in future are periodically intended to send what are known as "cooperative awareness messages", which comprise at least a position information item and possibly also a speed and acceleration information item. In this case, the position information item can be produced comparatively easily exclusively from data from a global navigation satellite system, such as GPS. It is also possible for the speed and acceleration information item to be produced using the data from a global navigation satellite system, however.

Expediently, the association of the sensor data comprises the steps of
object recognition in the currently captured sensor data and/or
object tracking from the previously captured to the currently captured sensor data and/or
equalization of capture cycle differences in the sensors and/or the sensor types. The object recognition first of all allows the recognition of a particular object in the sensor data, i.e. an information item in the sensor data from the first and second sensor types is recognized as describing an object. This facilitates the association of information items describing identical objects and/or object attributes in the first and second sensor data. The object tracking additionally allows association over a plurality of capture cycles. By way of example, this allows an object moving relative to the sensor to be recognized as such and allows the object to be assigned the corresponding object attribute "movement". The object tracking is preferably effected by means of a Kalman filter, a particle filter or filter methods of the type in question. The equalization of capture cycle differences in the sensors or in the sensor types is of significance particularly when the sensors or the sensor types operate with very different capture cycle durations. In this case, it is possible to use extrapolation over time, for example, to form intermediate values for the sensor data from a sensor type in order thereby to simulate extremely largely uniform capture cycle durations and to allow unproblematic association of information items describing identical objects and/or object attributes. Overall, these steps therefore allow simple, comprehensive and reliable association of the information items describing identical objects and/or object attributes in different sensor data. The equalization of the capture cycle differences can also be carried out as a first step in this case. The other two steps can first of all be carried out for each sensor separately or else in direct combination for a plurality of sensors.

Furthermore, it is advantageous that threshold values for an object recognition algorithm acting on the first sensor data are reduced by means of the second sensor data. This results in the advantage that an information item describing an object in the second sensor data can be sought specifically in the first sensor data, and the recognition of said information item in the first sensor data is therefore simplified by virtue of the threshold value associated with the object recognition algorithm being reduced. As a result, an information item in the first sensor data that corresponds to the information item from the second sensor data is possibly recognized that would otherwise not have been recognized. Hence, in this case too, it becomes possible for these information items describing identical objects and/or object attributes in the first and second sensor data to be associated.

Preferably, an upper limit value is prescribed for the values of the fuzziness afflictions, and if said upper limit value is exceeded then, regardless of the comparison, the information items describing identical objects and/or object attributes in the first and second sensor data are not associated with one another. This results in the advantage that association of information items that is impossible or possible only under relatively difficult conditions and hence possibly only with limited reliability is prevented from the outset.

With particular preference, the upper limit value is adjusted on the basis of a captured ambient object density, wherein the upper limit value is decreased when an ambient object density rises and is increased when an ambient object density falls. Since a higher object density in the form of vehicles, cyclists and pedestrians can usually be expected in urban traffic, for example, than on a country road, this results in the advantage that the inventive method can be adapted to suit the respective ambient conditions in order to ensure the necessary reliability on the basis of the situation at all times.

Expediently, if first sensor data are contradictory and/or first sensor data are implausible then information items describing identical objects and/or object attributes in the first and second sensor data are always associated with one another. Since only those information items in the first sensor data that are relevant and plausible have corresponding information items in the second sensor data, there are also no irrelevant or implausible information items associated with one another and hence erroneously denoted as particularly reliable. Therefore, the inventive method can thus also be carried out reliably in the event of contradictory first sensor data or implausible first sensor data.

The invention additionally relates to a system for information use that comprises at least sensors of a first sensor type and sensors of a second sensor type and comparison means and association means and confirmation means, wherein the sensors of the first sensor type capture first sensor data and the sensors of the second sensor type capture second sensor data. The association means associate information items describing identical objects and/or object attributes in the first sensor data and information items describing identical objects and/or object attributes in the second sensor data with one another, wherein the first sensor data have first fuzziness afflictions and the second sensor data have second fuzziness afflictions. In this case, values of the second fuzziness afflictions are of at least the same magnitude as values of the first fuzziness afflictions. The system is distinguished in that the comparison means perform a comparison of the values of the first and second fuzziness afflictions of the information items describing identical objects and/or object attributes in the first and second sensor data, wherein if the values are of essentially the same magnitude then the association means associate the information items describing identical objects and/or object attributes in the first and second sensor data with one another, and wherein if the values are of essentially not the same magnitude then the confirmation means confirm or reject the information items describing identical objects and/or object attributes in the first sensor data with the second sensor data. The inventive system therefore comprises all the necessary means for carrying out the inventive method and easily allows comprehensive and reliable association of information items describing identical objects and/or object attributes in different sensor data from different sensor types. This results in the advantages already described.

Preferably, the system is distinguished in that the sensors of the first sensor type are one or more elements from the group
radar sensor,
optical camera sensor,
lidar sensor,
laser sensor and
ultrasonic sensor.

The cited elements are sensors typically used in the motor vehicle sector that essentially allow comprehensive capture and recognition of the vehicle environment. At the present time, a multiplicity of vehicles are already equipped with a plurality of the cited sensors as standard, and this number will in all probability rise further in future. The additional installation and cost involvement for implementing the inventive method in a motor vehicle is therefore low.

In addition, it is advantageous that the sensors of the second sensor type are one or more elements from the group
WLAN connecting means, particularly based on IEEE 802.11,
ISM (Industrial, Scientific, Medical band) connecting means,
Bluetooth® connecting means,
ZigBee connecting means,
UWB (Ultra Wide Band) connecting means,
WiMax® (Worldwide Interoperability for Microwave Access) connecting means,
Infrared connecting means,
mobile radio connecting means and
radar-based communication means.

These connecting means have various advantages and disadvantages in this case. By way of example, WLAN connections allow a high data transmission rate and fast connection setup. By contrast, ISM connections afford only a relatively low data transmission rate but are comparatively well suited to data transmission around obstacles to visibility. Infrared connections in turn likewise afford a low data transmission rate. Finally, mobile radio connections are not adversely affected by obstacles to visibility and additionally afford a good data transmission rate. In return, however, their connection setup is comparatively slow. The combination and simultaneous or parallel use of a plurality of these connection classes results in further advantages, since this allows the disadvantages of individual connection classes to be compensated for.

Preferably, the system carries out the inventive method.

An aspect of the invention also relates to the use of the inventive system in a vehicle, particularly in a motor vehicle.

BRIEF DESCRIPTION OF THE DRAWINGS

Further preferred embodiments can be found in the sub claims and in the description that follows for an exemplary embodiment with reference to figures, in which

DETAILED DESCRIPTION OF THE PREFERRED EMBODIMENTS

Figure 1:
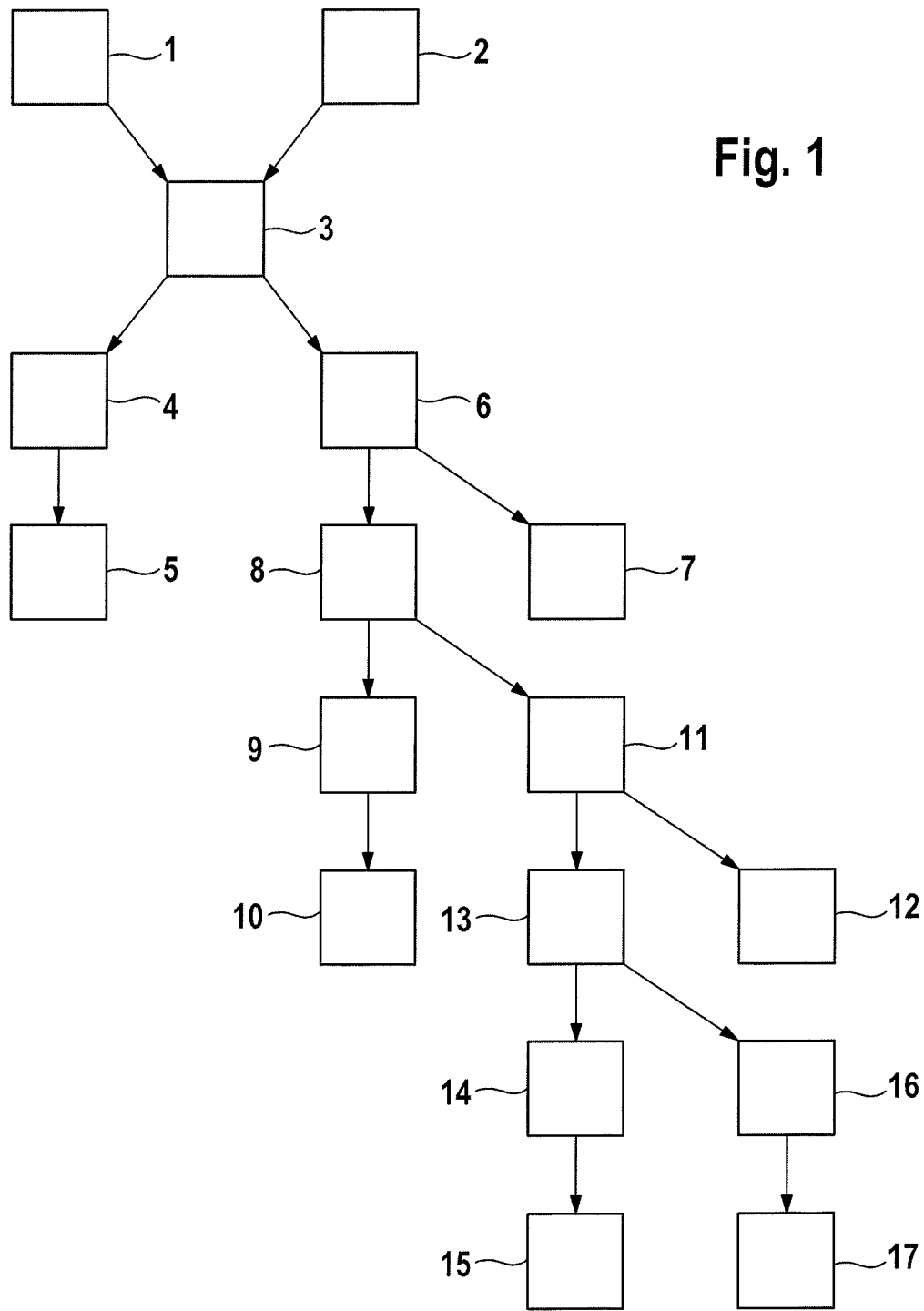
FIG. 1 shows an exemplary method sequence in the form of a flow chart.

FIG. 1 shows a possible sequence for the inventive method. In step 1, sensors of a first sensor type are first of all used to capture first sensor data from a vehicle. According to the exemplary embodiment shown, these data are ambient data that are captured by means of a camera sensor and a radar sensor and that describe the vehicle. In method step 2, sensors of a second sensor type are used to capture second sensor data, and in this case these are vehicle-to-X data from the same vehicle that are captured by means of vehicle-to-X communication means. In the subsequent step 3, the values of the fuzziness afflictions of the position information items that the ambient data and the vehicle-to-X data comprise are compared. If step 4 establishes that the value of the fuzziness affliction of the position information item in the vehicle-to-X data is between 75% and 125% of the value of the fuzziness affliction of the position information item in the ambient data, all information items describing identical objects and/or object attributes in the ambient data and the vehicle-to-X data are associated with one another in step 5. This corresponds to sensor data merging. The data associated in this manner are particularly reliable and can be used as a basis for autonomous or automated action taken in vehicle control. If, however, step 6 establishes that the value of the fuzziness affliction of the position information item in the vehicle-to-X data is not between 75% and 125% of the value of the fuzziness affliction of the position information item in the ambient data, the inventive method is continued according to steps 7 and 8. In step 7, the position information item that the vehicle-to-X data contain is used to confirm the position information item in the ambient data. It is thus deemed to have been confirmed that there is a vehicle at the location described by the position information items, for example, and incorrect capture by the camera sensor or the radar sensor can therefore be ruled out. However, the information confirmed in this manner is not exact enough and reliable enough to take as a basis for performing autonomous action taken in the vehicle control. In method step 8, the values of the fuzziness afflictions of the speed information items in the ambient data and in the vehicle-to-X data are then compared. If the subsequent step 9 can establish that the value of the fuzziness affliction of the speed information item in the vehicle-to-X data is between 75% and 125% of the value of the fuzziness affliction of the speed information item in the ambient data, the speed information items in the ambient data and the vehicle-to-X data are associated with one another in step 10. However, there is initially no association of further information items describing identical objects and/or object attributes in the ambient data and the vehicle-to-X data. If, however, step 11 establishes that the value of the fuzziness affliction of the speed information item in the vehicle-to-X data is not between 75% and 125% of the value of the fuzziness affliction of the speed information item in the ambient data, the inventive method is continued according to steps 12 and 13. In method step 12, the speed information item that the ambient data contain is confirmed by the speed information item that the vehicle-to-X data contain. In step 13, a further comparison is made, and in this case the values of the fuzziness afflictions of the acceleration information items in the ambient data and in the vehicle-to-X data are compared. If step 14 establishes that the value of the fuzziness affliction of the acceleration information items in the vehicle-to-X data is between 75% and 125% of the value of the fuzziness affliction of the acceleration information items in the ambient data, the acceleration information items in the ambient data and in the vehicle-to-X data are associated with one another in step 15. In this case too, in a similar manner to step 10, no further information items describing identical objects and/or object attributes in the ambient data and the vehicle-to-X data are associated with one another. If, however, step 16 establishes that the value of the fuzziness affliction of the acceleration information items in the vehicle-to-X data is not between 75% and 125% of the value of the fuzziness affliction of the acceleration information items in the ambient data, step 17 merely confirms the acceleration information item in the ambient data.

Figure 2:
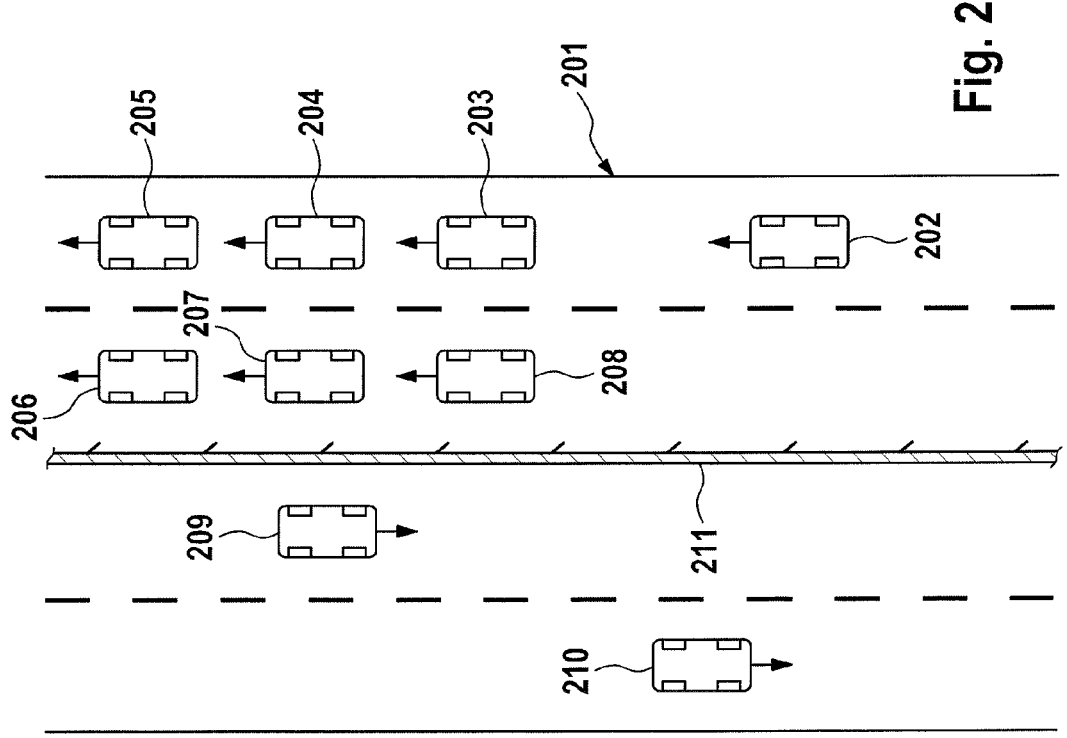
FIG. 2 shows an exemplary traffic situation in which an information item comprising the second sensor data is used to confirm an information item corresponding to said information item in the first sensor data.

FIG. 2 shows a four-lane road 201 with vehicles 202, 203, 204, 205, 206, 207, 208, 209 and 210. The arrows on vehicles 202, 203, 204, 205, 206, 207, 208, 209 and 210 indicate the direction of travel in each case. As can be seen, vehicles 209 and 210 are moving in the opposite direction to vehicles 202, 203, 204, 205, 206, 207 and 208. The two left-hand lanes are separated from the two right-hand lanes by guardrail 211. According to the example, vehicle 202 is equipped with the inventive system for information use. Vehicle-to-X communication means that are in place in vehicle 202 are used by vehicle 202 to receive vehicle-to-X data from vehicles 202, 203, 204, 205, 206, 207 and 208, which vehicle-to-X data comprise the information that vehicles 202, 203, 204, 205, 206, 207 and 208 are in a traffic queue and are not moving. A stereo camera sensor that is likewise in place in vehicle 202 is simultaneously used to capture ambient data, which, however, comprise the information that vehicles 203 and 208 are moving along at low speed in the direction of travel. A comparison of the values of the fuzziness afflictions of the movement information item in the stereo camera sensor data and in the vehicle-to-X data reveals that the values of the fuzziness afflictions essentially do not correspond. Therefore, these information items are not associated with one another, but rather the information items captured by means of the vehicle-to-X communication means are merely used to confirm that vehicles 203 and 208 are moving along very slowly relative to vehicle 202 and there is no incorrect capture by the camera sensor. The movement information confirmed in this manner is used to output a warning to the driver of vehicle 202 so that he reduces the speed of travel in order to avoid a shunt accident.

Figure 3:
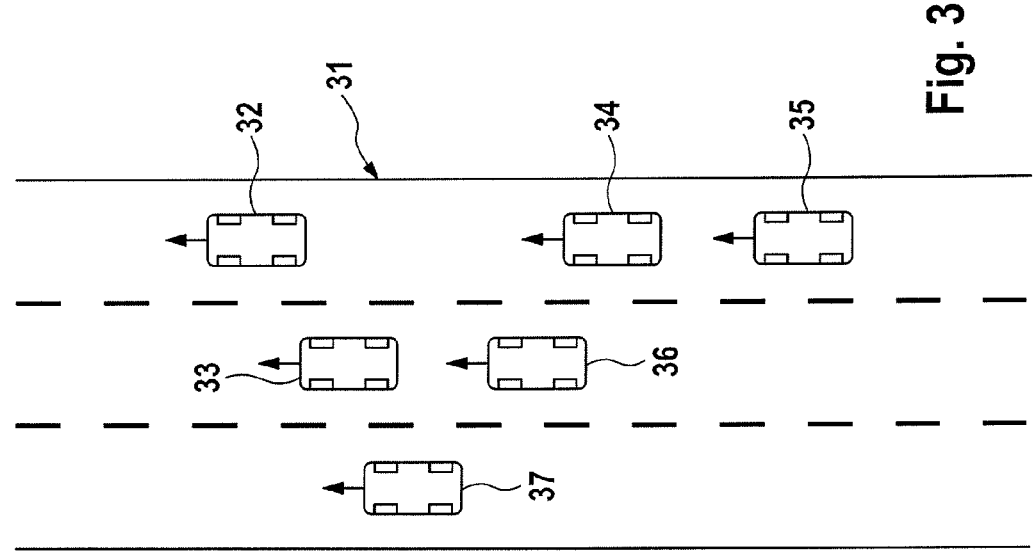
FIG. 3 shows a further exemplary traffic situation in which threshold values for an object recognition algorithm acting on the first sensor data are reduced by means of the second sensor data.

FIG. 3 shows a three-lane road 31 with vehicles 32, 33, 34, 35, 36 and 37. The arrows on vehicles 32, 33, 34, 35, 36 and 37 each indicate the direction of travel. Vehicle 36 is equipped with the inventive system for information use, with vehicle-to-X communication means and with a lidar sensor. The vehicle-to-X communication means are used by vehicle 36 to capture vehicle-to-X data comprising position information items and speed information items from vehicles 32, 33, 34, 35 and 37. In this case, the position information items and speed information items that the vehicle-to-X data contain describe the fact that vehicles 32, 33, 34, 35 are moving along at an essentially identical speed that essentially corresponds to that of vehicle 36. However, the speed information item associated with vehicle 37 describes a speed that is significantly increased in comparison with vehicles 32, 33, 34, 35 and 36. This speed information item is used to reduce a threshold value for an object recognition algorithm acting on the lidar sensor data in vehicle 36. Hence, when vehicle 37 enters the capture range of the lidar sensor of vehicle 36, the speed information item associated with vehicle 37 is captured via the lidar sensor in accelerated fashion, since the statistical certainty of this information item being recognized must only reach the reduced threshold value of the object recognition algorithm.

The invention claimed is:
1. A method for information use within a vehicle, the method comprising:
 capturing, by a first vehicle sensor type, first sensor data by detecting distances to objects or capturing images of the objects,
 capturing, by a second vehicle sensor type, second sensor data by receiving wireless communication indicating presence of the objects,
 comparing, by the processor, a value of a first fuzziness affliction of information items describing an identified object and/or object attributes of the identified object in the first sensor data, with a value of a second fuzziness affliction of information items describing the identified object and/or object attributes of the identified object in the second sensor data,
 associating, by the processor, the information items describing the identified object and/or object attributes of the identified object in the first and second sensor data with one another when a difference in a magnitude value between the first and second fuzziness afflictions is less than or equal to a threshold, and
 confirming, by the processor, validity of the information items describing the identified object and/or object attributes of the identified object in the first sensor data when the difference in the magnitude values is greater than the threshold.

2. The method as claimed in claim 1, wherein
the sensors of the first sensor type are ambient sensors and the sensors of the second sensor type are vehicle-to-X communication means.

3. The method as claimed in claim 2, wherein
the first and second sensor data respectively comprise at least one position information item, and the values of the fuzziness afflictions of the position information items are used for the comparison first of all.

4. The method as claimed in claim 3, wherein
at least the position information item in the second sensor data has been produced using data from a global navigation satellite system prior to being sent via the vehicle-to-X communication means.

5. The method as claimed in claim 1, wherein
the association of the sensor data comprises the steps of
object recognition in the currently captured sensor data and/or
object tracking from the previously captured to the currently captured sensor data and/or
equalization of capture cycle differences in the sensors and/or the sensor types.

6. The method as claimed in claim 1, wherein
threshold values for an object recognition algorithm acting on the first sensor data are reduced by the second sensor data.

7. The method as claimed in claim 1, wherein
an upper limit value is prescribed for the values of the fuzziness afflictions, and if said upper limit value is exceeded then, regardless of the comparison, the information items describing the identified object and/or object attributes of the identified object in the first and second sensor data are not associated with one another.

8. The method as claimed in claim 7, wherein
the upper limit value is adjusted on the basis of a captured ambient object density, wherein the upper limit value is decreased when an ambient object density rises and is increased when an ambient object density falls.

9. The method as claimed in claim 1, wherein
if first sensor data are contradictory and/or first sensor data are implausible then information items describing the identified object and/or object attributes of the identified object in the first and second sensor data are always associated with one another.

10. A system for information use within a vehicle, comprising:

vehicle sensors of a first sensor type for detecting distances to objects or capturing images of the objects;
vehicle sensors of a second sensor type for receiving wireless communication indicating presence of the objects; and
a processor configured to:
receive data captured by the vehicle sensors of the first sensor type and the vehicle sensors of the second sensor type,
compare a value of a first fuzziness affliction of information items describing an identified object and/or object attributes of the identified object in the first sensor data, with a value of a second fuzziness affliction of information items describing the identified object and/or object attributes of the identified object in the second sensor data,
associate the information items describing the identified object and/or object attributes of the identified object in the first and second sensor data with one another when a difference in a magnitude values between the first and second fuzziness afflictions is less than or equal to a threshold, and
confirm validity of the information items describing the identified object and/or object attributes of the identified object in the first sensor data when the difference in the magnitude values is greater than the threshold.

11. The system as claimed in claim 10, wherein the sensors of the first sensor type are one or more elements selected from the group consisting of
a radar sensor,
an optical camera sensor,
a lidar sensor,
a laser sensor and
an ultrasonic sensor.

12. The system as claimed in claim 10, wherein
the sensors of the second sensor type are one or more elements selected from the group consisting of
WLAN connecting means, based on IEEE 802.11,
ISM (Industrial, Scientific, Medical band) connecting means,
IEEE 802.15.1 connecting means,
IEEE 802.15.4 connecting means,
UWB (Ultra Wide Band) connecting means,
IEEE 802.16 connecting means,
Infrared connecting means,
mobile radio connecting means and
radar-based communication means.

* * * * *